Figure 1:
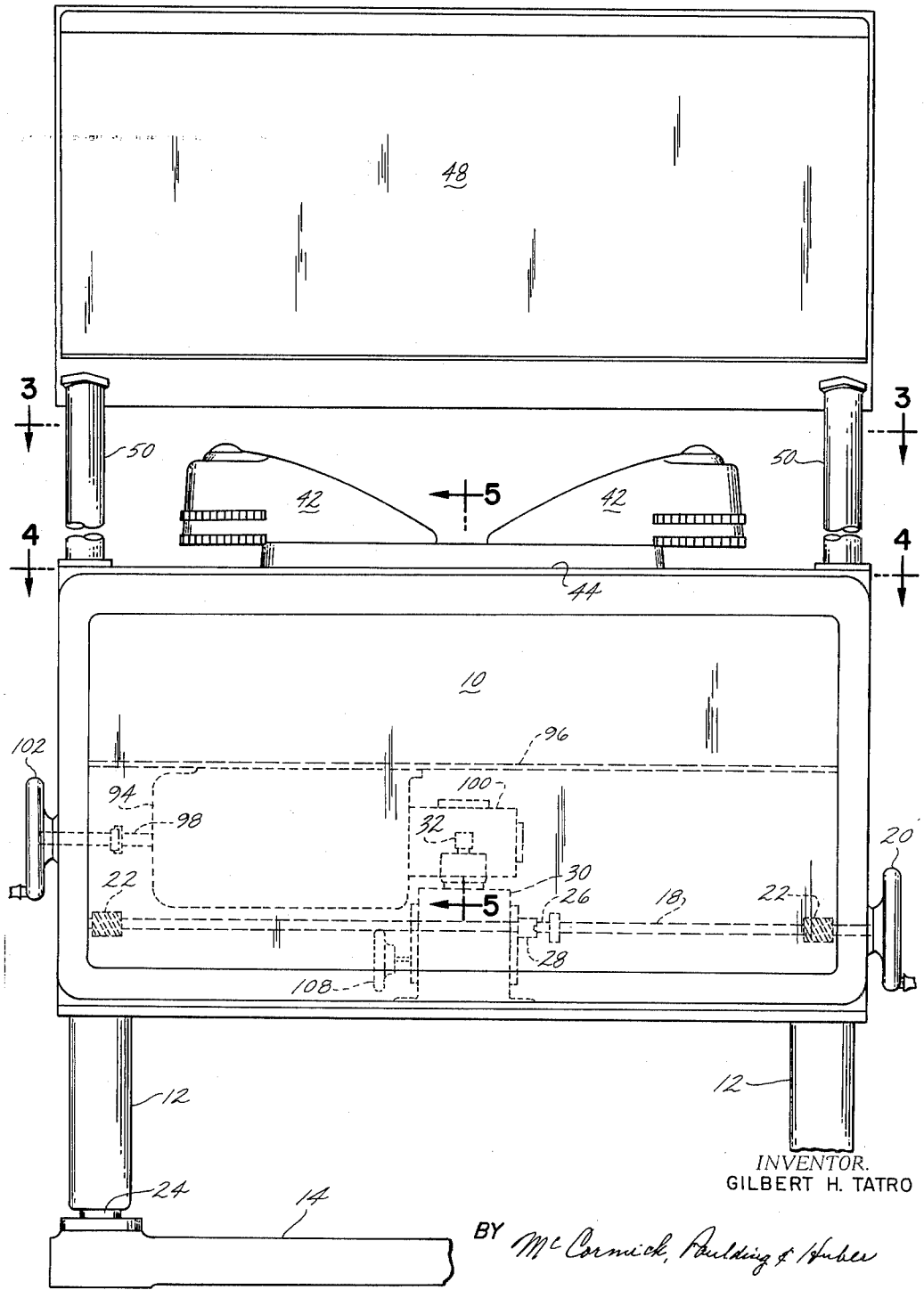

June 14, 1966  G. H. TATRO  3,255,862
MECHANISM FOR HANDLING GLASS CONTAINERS
Filed July 15, 1964  5 Sheets-Sheet 1

INVENTOR.
GILBERT H. TATRO
BY McCormick, Paulding & Huber
ATTORNEYS

June 14, 1966  G. H. TATRO  3,255,862
MECHANISM FOR HANDLING GLASS CONTAINERS
Filed July 15, 1964  5 Sheets-Sheet 2

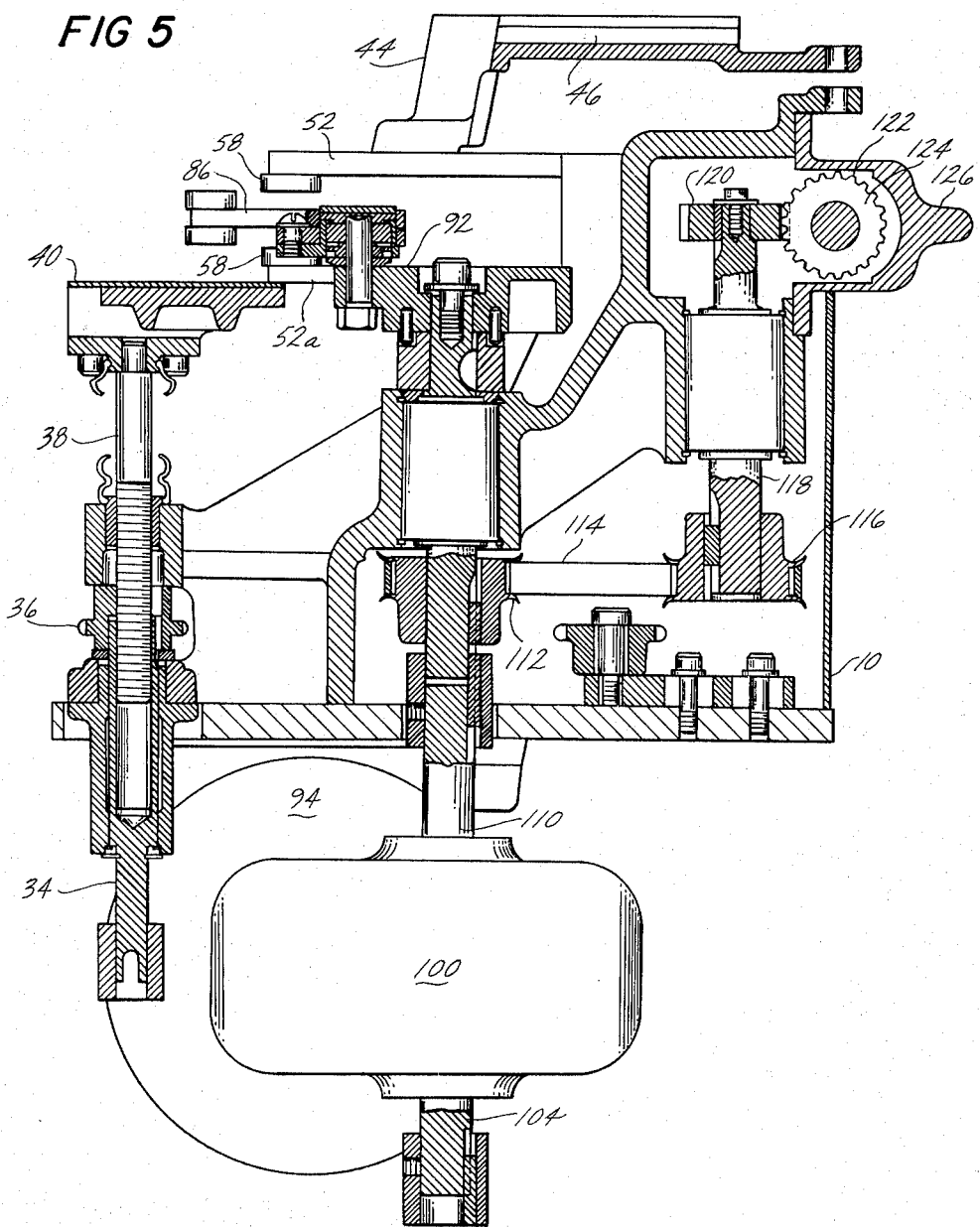

United States Patent Office 3,255,862
Patented June 14, 1966

3,255,862
MECHANISM FOR HANDLING GLASS
CONTAINERS
Gilbert H. Tatro, Ellenville, N.Y., assignor to Emhart
Corporation, Bloomfield, Conn., a corporation of Connecticut
Filed July 15, 1964, Ser. No. 382,837
13 Claims. (Cl. 198—19)

This invention relates to an improved machine for handling glass containers and, more particularly, to a machine adapted to be associated with a conveyor to remove glass containers from the conveyor, and then index them through a plurality of stations, including at least one station where each of the containers is inspected in sequence, and for finally returning the containers to the conveyor at a downstream position thereon.

Many of the machines heretofore used for the handling of glass containers for inspection purposes have been of a type which handle the containers while they are being transported on a conveyor, and this involves the use of a mechanism which can be intermittently driven to operate on each container passing in the line on the conveyor. It is the general object of the present invention to provide a relatively inexpensive machine or mechanism which can be associated with a conveyor transporting glass containers but which diverts them from the conveyor to the machine and then back to the conveyor and which can employ a continuous drive for handling the containers.

It is a more specific object of the invention to provide a glass container handling machine or mechanism of the aforementioned type which can easily be set up for operation in association with a conveyor and which, due to its continuous drive, can operate at reduced power as compared to intermittent drive machines but which can still handle as many articles of glassware for a given period of time as most intermittently driven machines and more than many intermittently driven machines.

It is a still further specific object of the invention to provide a machine as described and which, due to the continuous drive means that is employed and the reduction of power needed thereby, will be less apt to cause container breakage due to a container jamming the machine.

As will be described in greater detail hereinafer, a machine provided in accordance with the present invention, includes a floor defining a generally arcuate path for movement of glass containers from an inlet end to an outlet end which are respectively positioned adjacent a conveyor at upstream and downstream positions relative thereto. The machine or mechanism also includes means supported above the arcuate floor and defining a series of pockets along the radially inner edge of the floor path which provide stations for receiving the glass containers in step-by-step movement. Each of these pockets defines a station for the containers, and various inspection operations can be performed at the various stations. The mechanism also includes a continuously driven indexing member which operates within a closed, substantially circular loop, so that it is withdrawn radially inwardly of the arcuate path and then projected radially outwardly into the path to engage containers at the various stations and to move them along from station to station. A resilient retaining means cooperates with the driven indexing member to guide the containers to the station-defining pockets as they are moved along the arcuate path, and at certain of the inspection stations, rollers or other driven means are supported on the aforesaid resilient retaining means to rotate the articles of glassware or containers for inspection purposes. When all of the inspection operations have been completed, the satisfactory glassware containers are moved from the outlet of the arcuate path back onto the conveyor, while those containers failing to pass inspection will have been removed before being readmitted to the conveyor.

The drawings show a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
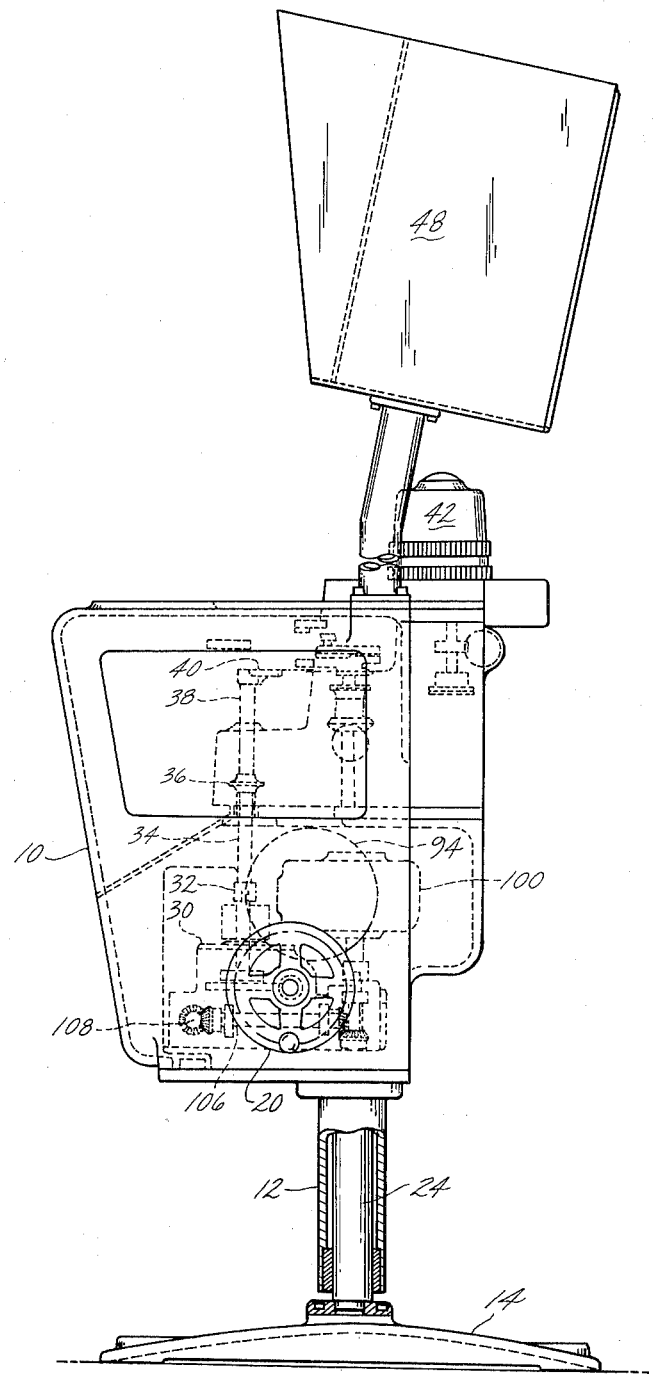
Figure 3:
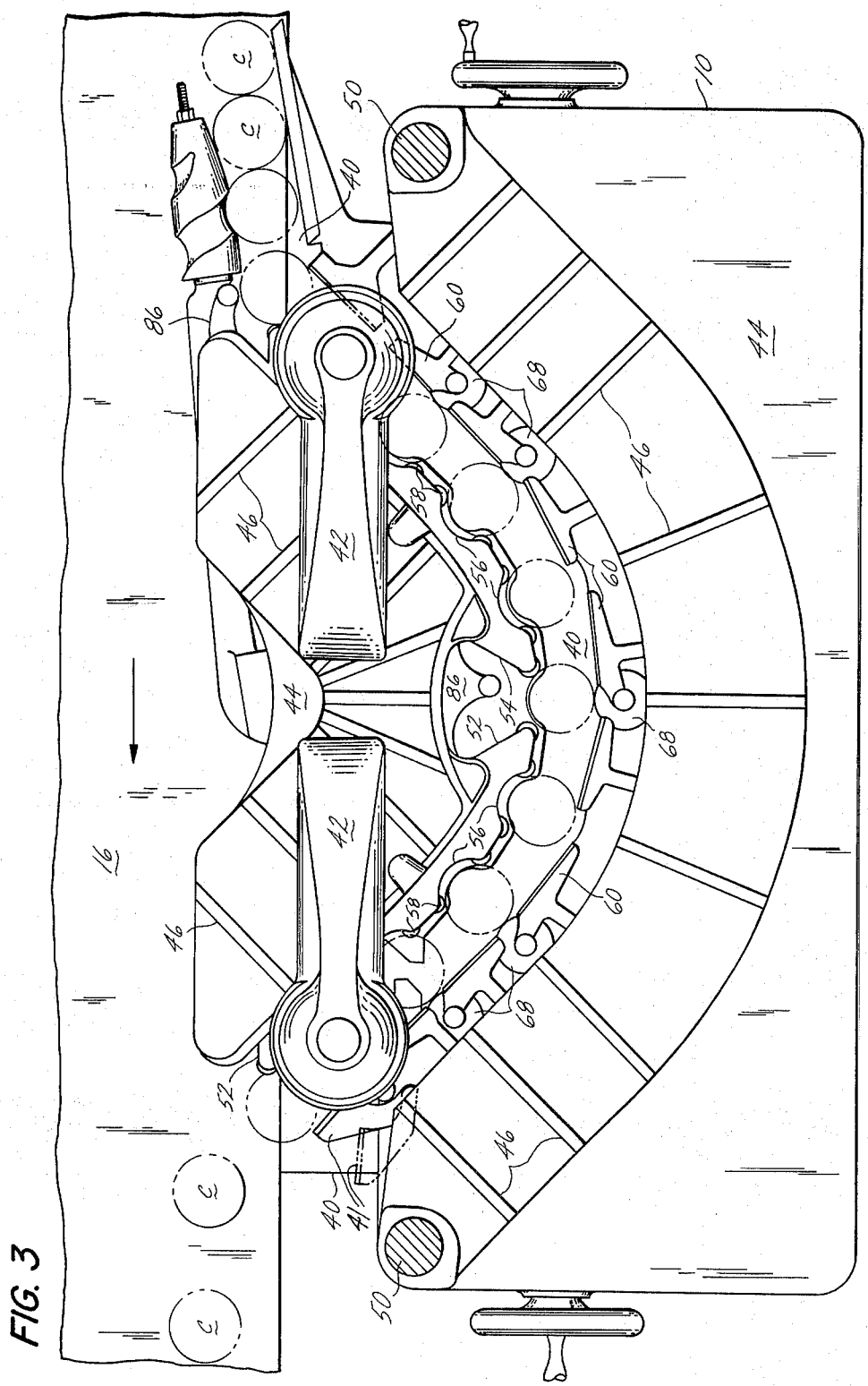
Figure 4:
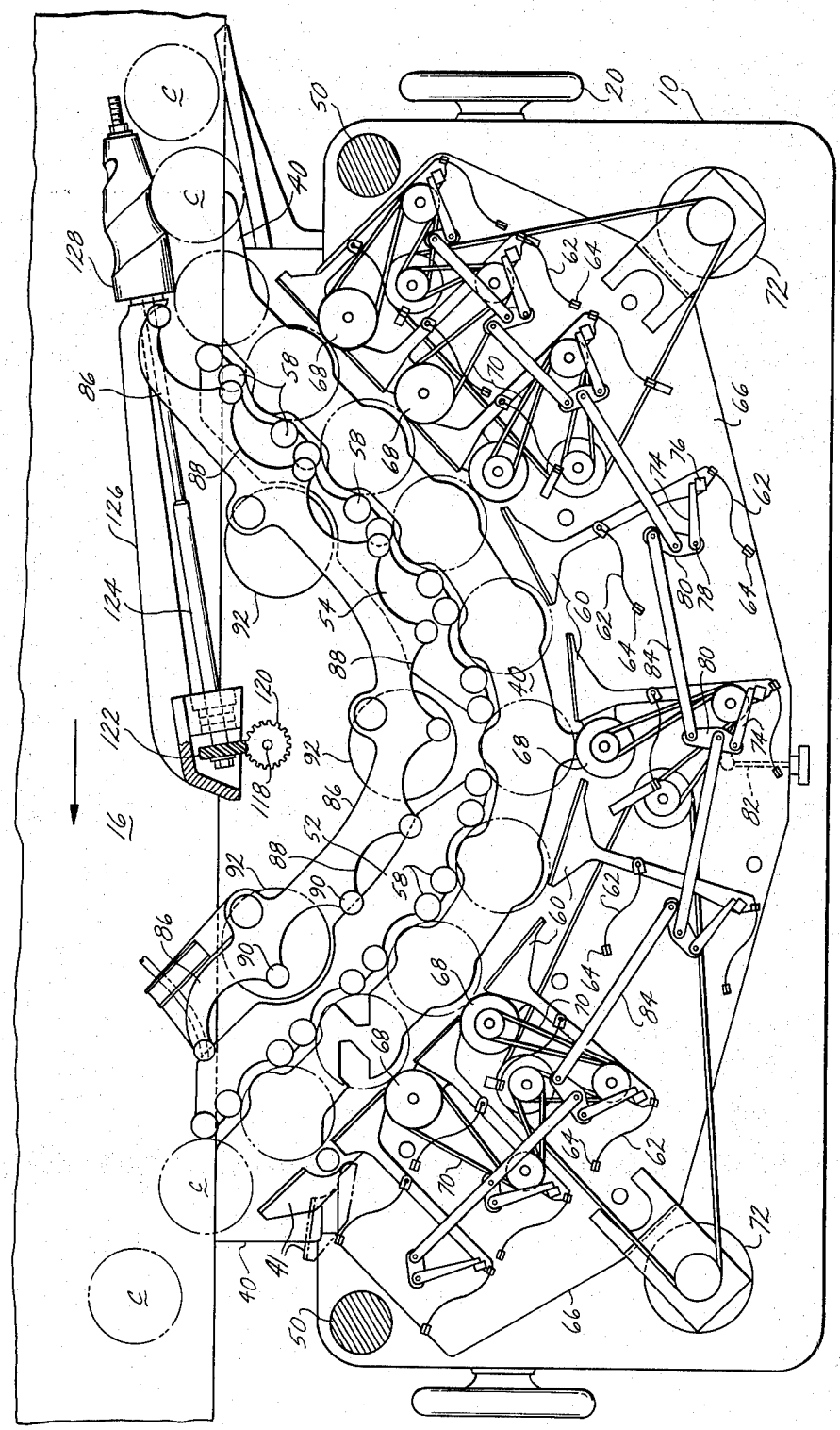

Of the drawings:
FIG. 1 is a front elevational view of a glass container headling machine constructed in accordance with the present invention;
FIG. 2 is a right-hand end view of the machine shown in FIG. 1;
FIG. 3 is an enlarged horizontal cross sectional view taken as indicated by the line 3—3 of FIG. 1;
FIG. 4 is a further horizontal cross sectional view taken in about the plane indicated by the line 4—4 of FIG. 1; and
FIG. 5 is a vertical cross sectional view taken as indicated by the line 5—5 of FIG. 1.

As best seen with reference to FIGS. 1 and 2, the elements of the machine of this invention are housed within a cabinet-like frame 10 which is vertically adjustably supported on a pair of legs 12, 12 extending upwardly from a base 14 which rests on the floor. This structure is adapted to be moved into position at the edge of a conventional conveyor 16 (FIGS. 3 and 4) which is used to move a series of glass container or other glassware articles C, C from right to left at the rear of the machine when it is positioned at the side of the said conveyor.

The vertical adjustment of the cabinet frame 10 relative to the base 14 is achieved by rotating a transversely extending shaft 18, as by a hand wheel 20. The said shaft has gear means 22 comprising a worm which engages a worm gear collar on a post 24 associated with each leg 12 to vertically adjust the entire machine 10 upwardly relative to the base 14 when the hand wheel 20 is turned in one direction, and to adjust it vertically downwardly when the hand wheel is turned in the opposite direction. A clutch 26 serves to connect an input shaft 28 to a gear box 30 having an output 32 connected as by a shaft 34 to a sprocket 36 (FIG. 2). This sprocket is screw threaded on a leg 38 forming a part of a support for a floor member 40 which will be described in greater detail hereinafter. There are two additional legs, similar to the leg 38 supporting the floor 40, and and endless chain is entrained over sprockets on these legs (not shown) as well as the sprocket 36 so that upon rotation of the shaft 34 by the hand wheel 20 with the clutch 26 engaged, screw threaded sprockets on the support legs for the floor 40 can be turned to raise and to lower the said floor.

This floor 40, as shown in FIGS. 3 and 4, is disposed horizontally and it has an inlet end associated with the conveyor 16 and an outlet end associated with the said conveyor at respectively upstream and downstream locations so that the glassware articles C, C can be received at the inlet end and moved along the arcuate path defined by the floor 40 to the outlet where they are returned to the conveyor. Obviously, it is desirable to adjust the vertical height of the floor or floor plate 40 to the elevation of the conveyor 16. When the clutch 26 is disengaged manually, the entire machine including the floor plate 40 is adjusted vertically to bring the said floor plate into the same horizontal plane as the conveyor. Then, with the floor plate 40 properly positioned vertically, the hand wheel 20 can be turned with the clutch 26 engaged to adjust all elements of the machine, except the floor plate 40, vertically. This adjustment adjusts the machine to handling glass containers or other articles C, C of differing height.

It is the general purpose of the machine to perform one or more test or inspection operations on the glass containers as they are moved along the arcuate path of the floor plate 40 into and out of a plurality of stations therealong. This inspection or testing of the glassware is performed to locate faulty articles and to remove them from the series being transported by the conveyor. The faulty articles are removed through a pivotable reject gate 41 (FIGS. 3 and 4) which is operated by any one of a series of test devices to open so that the faulty articles can be thrust onto a reject conveyor or into a waste container not shown. There are a series of test or inspection operations to be performed, and these operations are performed by various devices forming no part of the present invention. However, for purposes of illustration, two inspection heads 42, 42 are shown mounted on the radially inner side of the arcuate floor plate 40 on the top 44 of the cabinet frame 10. As seen in FIG. 3, the top wall 44 of the cabinet 10 has a portion radially inwardly of the floor plate 40 and a portion radially outwardly thereof, and both such portions are provided with a series of elongated inverted T-shaped slots, 46, 46 which facilitate the mounting of various inspection or testing devices that can be used to operate on the glass containers C, C at various stations along the said floor plate.

A control panel 48 (FIGS. 1 and 2) is supported above the cabinet 10 on a pair of legs 50, 50 to operate or to control operation of the various inspection devices that may be employed with this machine, and this control panel is also connected with a rejecting mechanism (not shown) which will be used to divert faulty articles C, C at the outlet end of the floor plate 40 before they are replaced on the conveyor 16. This control panel and the rejecting mechanism have no part in the present invention which relates to the machine or mechanism for handling the glass containers C, C or other articles and moving them from station to station along the floor plate 40 for purposes of inspection.

As has been said, and as is shown in FIGS. 3 and 4, the floor plate 40 is of generally arcuate shape to provide an arcuate path for movement of the glass containers C, C so that the said containers can be inspected at one or more stations along the said path. The radially inner edge of said path and the various stations therealong are defined by means supported above the floor and having a series of pockets along the radially inner edge of the path to receive the containers. Such means comprises a pair of plates 52 and 54 which are connected to and supported from the underside of the top wall 44 of the frame 10 radially inwardly of the floor plate 40. A similar pair of horizontal plates, including a plate 52a below the plate 52 and a similar plate below the plate 54, are supported by internal frame structure closer to the floor 40. These plates have a series of serrations 56, 56 along their radially outer edges, and rollers 58, 58 are rotatably mounted on the plates to engage the vertical wall of the glass containers C, C located at the various pockets or serrations 56, 56 and they thereby cooperate with said pockets to define the stations, including at least one inspection station, where the glassware articles can stand and be rotated about their vertical axes, if desired.

The radially outer edge of the arcuate path is defined by a series of resiliently or yieldably mounted shoes 60, 60. Each such shoe 60 is supported by a pair of leaf springs 62, 62 held by fixtures 64, 64 which extend upwardly from a frame plate 66 that is disposed horizontally below the top wall 44 of the cabinet 10. Some of the shoes 60, 60 support rollers 68, 68 which engage the glass containers located at certain of the inspection stations as shown. These driven rollers cooperate with the rotatable rollers 58, 58 to rotate the glass containers at these inspection stations for inspection purposes. The rollers 68, 68 are driven in groups by a network of interconnected expansible belts 70, 70 entrained over suitable pulleys driven as by a pair of drive motors 72, 72 which are supported on the frame plate 66.

The shoes 60, 60 also cooperate with means for moving the glass containers C, C from station to station along the arcuate path on the floor plate 40. In order to cooperate with such means, the said shoes are biased radially inwardly of the arcuate path by the support springs 62, 62, but a limit is placed on such radially inward movement. That is, a stop arm 74 is associated with each shoe 60 to engage a lug 76 thereon and to limit the radial inward movement of the shoe. Each stop arm 74 is adjustably fixed in position about a pivot pin 78 having a link 80 also connected thereto. One of said pivot pins and link sets is engaged by manually adjustable means indicated generally by the reference numeral 82 to fix the position of the associated arm 74 and link 80, and all of the said links are interconnected as by linkages 84, 84 so that the adjustment of the one shoe 60 by the manually operable means 82 adjusts the radially inward position of all of the shoes.

The said means cooperating with the resiliently mounted shoes 60, 60 to move the glass containers C, C from station to station comprises a generally arcuate indexing member 86 (FIGS. 3, 4 and 5). Like the plates 52 and 54, the indexing member 86 is provided with a series of pockets 88, 88 on its radially outer edge and a series of freely rotatable rollers 90, 90 adjacent thereto, the number of pockets 88, 88 being equal to the number of stations along the path so that the indexing member 86 can engage glassware articles at all of the said stations. As best seen in FIG. 4, the indexing member 86 is mounted and driven on three cranks 92, 92 which are arranged so that their centers of rotation do not fall in a straight line. This permits only one of the cranks to be driven while the other two cranks 92, 92 can rotate freely. Thus, the indexing member 86 is driven through a closed loop in a horizontal plane which serves to withdraw the indexing member radially inwardly of the arcuate path and then to thrust it radially outwardly into the path to engage the glass containers at the stations of the path and to move them along in sequence from station to station. Obviously, those glass containers residing in the stations toward the right in FIG. 4 will be engaged earlier than those residing at the stations toward the left. However, during one cycle of rotation through the closed loop, all of the said containers will be engaged and moved, the farthest left container being moved off the floor 40 and back onto the conveyor 16.

The drive means associated with and including the cranks 92, 92 is best shown in FIGS. 1 and 5 and includes a drive motor 94 which is secured to the underside of a transversely extending frame plate 96 inside the cabinet 10. The motor 94 has an output shaft 98 having one end extending into a gear box 100 and another end extending toward the left side of the cabinet 10 where it can be clutched by a hand wheel 102 to drive the indexing mechanism manually when the motor 94 is not operating. The gear box 100 has an output shaft 104 extending downwardly where it is geared to a forwardly extending shaft 106 (FIG. 2). A bevel gear on the front end of the shaft 106 engages with a bevel gear on a shaft 108 which extends toward the left (FIG. 1) for connection with a timing drum (not shown). The timing drum is driven to operate various switches and the like for the various inspection mechanisms that may be used with this machine.

The gear box 100 also has an upwardly extending output shaft 110 (FIG. 5) which at its upper end is secured to the center crank 92. Thus the said center crank is rotated in timed relationship with the previously mentioned timing drum so that the indexing member 86 is rotated in timed relationship therewith to move the glass containers C, C from station to station in timed relationship with the inspection operations that take place at one or more of the stations.

In addition, the upwardly extending driven shaft 110 has a pulley 112 keyed thereto between its ends, and a belt 114 extends from the pulley 112 to a pulley 116 secured to the lower end of a vertically supported shaft 118. The shaft 118 is located on the radially inner side of the indexing member 86 in spaced relationship thereto, and a spiral gear 120 is keyed to the upper end of said shaft as shown in FIGS. 4 and 5. The spiral gear 120 engages a spiral gear 122 on the end of a shaft 124 which is rotatably supported by an arm 126 to extend over the conveyor 16 toward the inlet end of the arcuate path defined by the floor plate 40. A tapered feed screw 128 is keyed to the extending end of the shaft 124 to engage glass containers C, C moving downstream on the said conveyor. The feed screw then advances said containers to the inlet end of the floor plate path in timed relationship to the operation of the indexing member 86 so that a container will be positioned for engagement by the indexing member during each cycle of rotation thereof.

Thus, each of a series of glass containers is advanced step-by-step off the conveyor 16 into the inlet of the arcuate path, and each of the containers is advanced step-by-step from station to station along the said arcuate path, each step of advance taking place during each cycle of rotation of the indexing member 86. During such rotation of the indexing member, the containers are engaged in pockets defined by the plates 52 and 54 and moved radially outwardly on the floor plate 40 where they are engaged by the yieldably or resiliently mounted shoes 60, 60 which guide and press them into the adjacent pockets or stations in cooperation with the indexing member.

Since the indexing member 86 does not simultaneously engage all of the containers C, C at the stations on the floor, and since the indexing member is being continuously driven, less power is needed to overcome the inertia. This means that the machine can be driven with relatively little power and it also means that in the event a container becomes jammed in the machine, it can many times stop operation of the machine without breakage of the container.

A further, and less apparent advantage of the indexing mechanism described is that it can be used without changing parts to handle containers of various size. It is only necessary to adjust the stop mechanism 82 to position the shoes 60, 60 radially inwardly or radially outwardly for change in the size of the containers being handled. Accordingly, it is unnecessary to remove parts from the machine and to substitute alternate parts therefor as is the case with some prior machines when running a series of containers of different size than have run through the machine previously.

The invention claimed is:

1. A machine for indexing a series of articles from station to station for inspection at at least one of said stations, comprising a floor defining a generally arcuate path for movement of the articles, means supported above the floor defining a series of pockets along the radially inner edge of the path which provide stations, including an inspection station, for the positioning of the articles, means for releasably retaining an article in each pocket, and means for moving the series of articles in sequence from station to station including a member engageable with articles at all of the said stations, and driven means connected to said member to move the same in a closed loop so as to withdraw it radially inwardly of said path and then project it into the path to engage the articles at the stations and to cooperate with said retaining means to move articles from station to station.

2. A machine for indexing a series of articles from station to station for inspection at at least one of said stations, comprising a floor defining a generally arcuate path for movement of the articles, means supported above the floor defining a series of pockets along the radially inner edge of said path which provide stations, including an inspection station, for positioning the articles, a series of resiliently mounted shoes defining the radially outer edge of said path and biased to urge said articles inwardly toward said pockets, and means for moving the series of articles in sequence from station to station including a member engageable with articles at all of the said stations, and driven means connected to said member to move the same in a closed loop so as to withdraw it radially inwardly of said path and then project it into the path to engage the articles at the stations and to cooperate with said shoes to move articles from station to station.

3. A machine for indexing a series of glass containers from station to station for inspection at at least one of said stations, comprising a floor defining a generally arcuate path for movement of the containers, means supported above the floor defining a series of pockets along the radially inner edge of said path which provide stations, including an inspection station, for positioning the containers, a series of resiliently mounted shoes defining the radially outer edge of said path and biased to urge said containers inwardly toward said pockets, a driven roller supported by one of said shoes to engage and rotate a container at said inspection station, and means for moving the series of containers in sequence from station to station including a member engageable with containers at all of the said stations, and driven means connected to said member to move the same in a closed loop so as to withdraw it radially inwardly of said path and then project it into the path to engage the containers at the stations and to cooperate with said shoes to move the containers from station to station.

4. A machine for indexing a series of glass containers as set forth in claim 3 wherein said member is of generally arcuate shape and has means on its radially outer edge engageable with the containers at all of the said stations.

5. A machine for indexing a series of glass containers from station to station for inspection at at least one of said stations, comprising a floor defining a generally arcuate path for movement of the containers, means supported above the floor defining a series of pockets along the radially inner edge of said path which provide stations, including an inspection station, for positioning the containers, a series of resiliently mounted shoes defining the radially outer edges of said path and biased to urge said containers inwardly toward said pockets, and means for moving the containers in sequence from station to station including a generally arcuate member having means on its radially outer edge engageable with containers at all of said stations, and crank means connected to said member to move the same in a closed loop so as to withdraw it radially inwardly of said path and then project it into the path to engage the containers and to cooperate with said shoes to move the containers from station to station.

6. A machine for indexing glass containers as set forth in claim 5 wherein the said crank means comprises one driven crank connected to the said member and two freely rotatable cranks connected thereto and with the centers of rotation of all of said cranks lying in other than a straight line.

7. A mechanism for receiving a series of articles from a conveyor for inspection and for returning them to the conveyor, comprising a floor defining a generally arcuate path for movement of the articles from an inlet to an outlet respectively located adjacent the conveyor at upstream and downstream positions, means supported above the floor defining a series of pockets along the radially inner edge of the path which provide stations, including an inspection station, for the positioning of the articles, means for releasably retaining an article in each pocket, and means for moving the articles in sequence from station to station including a member engageable with articles at all of the stations, and driven means connected to said member to move the same in a closed loop so as to withdraw it radially inwardly of said path and then project it into the path to engage the articles at the stations and to cooperate with said retaining means to move articles from station to station.

8. A mechanism as set forth in claim 7 wherein said retaining means comprises a series of resiliently mounted shoes defining the radially outer edge of said path and biased to urge said articles inwardly toward said pockets.

9. A mechanism for receiving a series of glass containers from a conveyor for inspection and for returning them to the conveyor, comprising a floor defining a generally arcuate path for movement of the containers from an inlet to an outlet respectively located adjacent the conveyor at upstream and downstream positions, means supported above the floor defining a series of pockets along the radially inner edge of the path which provide stations, including an inspection station, for the positioning of the containers, a series of resiliently mounted shoes defining the radially outer edge of said path and biased to urge said containers inwardly toward said pockets, means for moving the containers in sequence from station to station including a member engageable with containers at all of the stations, drive means connected to said member to move the same continuously in a closed loop so as to withdraw it radially inwardly of the path and then project it into the path to engage the containers at the stations and to cooperate with said shoes to move the containers from station to station, and rotating means connected with said drive means to engage containers on the conveyor and to direct them into said inlet.

10. A mechanism for receiving a series of glass containers from a conveyor for inspection and for returning them to the conveyor, comprising a floor defining a generally arcuate path for movement of the containers from an inlet to an outlet respectively located adjacent the conveyor at upstream and downstream positions, means supported above the floor defining a series of pockets along the radially inner edge of the path which provide stations, including an inspection station, for the positioning of the containers, a series of resiliently mounted shoes defining the radially outer edge of said path and biased to urge said containers inwardly toward said pockets, a driven roller supported by one of said shoes to engage and rotate a container at said inspection station, means for moving the containers in sequence from station to station including a member engageable with the containers at all of the stations, and drive means connected to said member to move the same continuously in a closed loop so as to withdraw it radially inwardly of the path and then project it into the path to engage the containers at the stations and to cooperate with said shoes to move the containers from station to station.

11. A mechanism for handling a series of glass containers as set forth in claim 10 wherein said member is of generally arcuate shape and has means on its radially outer edge engageable with the containers at all of the stations.

12. A mechanism for handling a series of glass containers as set forth in claim 11 wherein said drive means includes a crank means comprising one driven crank connected to the said member and two freely rotatable cranks connected thereto with the centers of rotation of all of the cranks lying in other than a straight line.

13. A mechanism for handling a series of glass containers as set forth in claim 12 and including rotating means connected with said drive means to engage containers on the conveyor and to direct them into said inlet.

References Cited by the Examiner
UNITED STATES PATENTS 1,828,324  10/1931  Kruse _____ 198—22

HUGO O. SCHULZ, *Primary Examiner.*

E. A. SROKA, *Assistant Examiner.*